United States Patent
Bryne

(10) Patent No.: US 8,745,900 B2
(45) Date of Patent: Jun. 10, 2014

(54) AERODYNAMIC BICYCLE SHOE COVER AND PEDAL COVER

(75) Inventor: Richard M. Bryne, San Diego, CA (US)

(73) Assignee: Speedplay, Inc., San Diego, CA (US)

( * ) Notice: Subject to any disclaimer, the term of this patent is extended or adjusted under 35 U.S.C. 154(b) by 1084 days.

(21) Appl. No.: 12/472,255

(22) Filed: May 26, 2009

(65) Prior Publication Data

US 2010/0301632 A1      Dec. 2, 2010

(51) Int. Cl.
   *A43B 5/14*   (2006.01)
   *A43B 5/18*   (2006.01)

(52) U.S. Cl.
   CPC . *A43B 5/185* (2013.01); *A43B 5/18* (2013.01); *A43B 5/14* (2013.01)
   USPC .............................................. 36/131; 36/135

(58) Field of Classification Search
   CPC .............. A43B 5/14; A43B 3/02; A43B 5/18; A43B 5/185
   USPC ............... 36/131, 114, 115, 135, 72 R, 7.1 R; 74/563, 558.5, 594.6; D12/125, 126
   See application file for complete search history.

(56) References Cited

U.S. PATENT DOCUMENTS

| | | | | |
|---|---|---|---|---|
| 1,370,730 | A | * | 3/1921 | Carver .............................. 74/563 |
| 3,808,910 | A | | 5/1974 | Desbois |
| 3,859,867 | A | * | 1/1975 | Haines et al. .................... 74/563 |
| 4,055,005 | A | * | 10/1977 | Meinhart ......................... 36/135 |
| 4,599,914 | A | * | 7/1986 | Dunn et al. ...................... 74/563 |
| 4,735,107 | A | | 4/1988 | Winkie |
| 4,739,564 | A | | 4/1988 | Eser |
| 5,007,185 | A | | 4/1991 | Lazarski |
| 5,031,342 | A | * | 7/1991 | Crook ............................ 36/135 |
| 5,321,995 | A | * | 6/1994 | Zedan ............................ 74/563 |
| 5,371,903 | A | | 12/1994 | Lew |
| 5,406,647 | A | | 4/1995 | Lew |

(Continued)

FOREIGN PATENT DOCUMENTS

| | | |
|---|---|---|
| DE | 2816189 | 8/1979 |
| DE | 3149345 C2 | 1/1989 |

(Continued)

OTHER PUBLICATIONS bont.com, Bont Crono, www.bont.com/cycling/pages/bontcrono.html.

(Continued)

*Primary Examiner* — Jila M Mohandesi
(74) *Attorney, Agent, or Firm* — Sheppard, Mullin, Richter & Hampton LLP

(57) ABSTRACT

A new aerodynamic cover for a bicycle shoe and clipless bicycle pedal for improving speed when cycling. The aerodynamic cover has a main body including an ankle portion having a rear side, a heel portion connected to the ankle portion, and a sole portion connected to the heel portion and having an underside. An opening is formed in the sole portion for allowing a bicycle pedal to be engaged to the bicycle cleat. An outwardly extending fin stretches from the rear side of the ankle portion, around the heel portion, to the underside of the sole portion. The aerodynamic cover may further have a pedal layer, a cleat layer, and a base plate layer. A gap is defined between the pedal layer and the cleat layer. The gap inhibits excessive friction between the pedal layer and the cleat layer as the cleat is pivoted with respect to the pedal.

8 Claims, 16 Drawing Sheets

(56) References Cited

U.S. PATENT DOCUMENTS

| | | | |
|---|---|---|---|
| D413,711 S * | 9/1999 | Hicks, Jr. ................... | D2/909 |
| 6,309,010 B1 | 10/2001 | Whitten | |
| 6,494,117 B1 | 12/2002 | Bryne | |
| 6,581,493 B1 * | 6/2003 | Gillane ................... | 74/563 |
| D481,974 S * | 11/2003 | Evans ................... | D12/125 |
| 7,013,754 B2 * | 3/2006 | Milanowski ................ | 74/594.6 |
| 7,383,646 B2 * | 6/2008 | Hall ................... | 36/7.1 R |
| D595,620 S * | 7/2009 | Kingsbury ................ | D12/125 |
| 7,779,560 B2 * | 8/2010 | Kay ................... | 36/135 |
| D683,665 S * | 6/2013 | Smith ................... | D12/126 |
| 2004/0237705 A1 * | 12/2004 | Conarro et al. ................ | 74/563 |
| 2010/0107451 A1 * | 5/2010 | Kay et al. ................... | 36/135 |

FOREIGN PATENT DOCUMENTS

| | | |
|---|---|---|
| EP | 0106162 | 4/1984 |
| EP | 0894446 | 3/1999 |
| JP | 64023202 | 7/1989 |
| WO | 2004089741 | 10/2004 |

OTHER PUBLICATIONS pearlizumi.com, PI Aero Lycra Shoe Cover, www.pearlizurni.com/product.php?mode=view&pc_id=50&product_id=193110.

* cited by examiner

AERODYNAMIC BICYCLE SHOE COVER AND PEDAL COVER

BACKGROUND OF THE INVENTION

This invention relates generally to bicycle shoe covers and pedal covers and, more particularly, to a bicycle shoe cover and pedal cover that are aerodynamically optimized for bicycle racing.

Shoes and pedals play an important role in the aerodynamics of bicycle racing. During the top half of a pedal stroke, both the shoe and pedal travel into the wind faster than the rest of the bicycle frame and rider. Thus, improving the aerodynamics of shoes and pedals is particularly valuable in terms of reducing wind drag and optimizing speed.

In the past, lycra shoe covers have been designed to improve the aerodynamics of bicycle shoes. An example is the Pearl Izumi Aero Lycra Shoe Cover, sold by Pearl Izumi USA, Inc. of Louisville, Colo. The lycra material is lightweight and breathable, and can be stretched to fit snugly over a bicycle shoe. A zipper closure secures the shoe cover in place. Although such shoe covers improve the aerodynamics of bicycle shoes, the aerodynamics are still less than optimal.

In the past, clipless pedal/cleat assemblies have been designed that allow the bicyclist to pivot a shoe cleat with respect to a bicycle pedal so that the cleat can be easily engaged to and disengaged from the pedal. These pedal/cleat assemblies have lacked an aerodynamic cover optimized for bicycle racing. For example, U.S. Pat. No. 6,494,117 to Bryne discloses a clipless pedal/cleat assembly having a float range that is easily and precisely adjusted. Although the pedal/cleat assembly disclosed in this patent is lightweight and presents only a small forward profile, the aerodynamics of this pedal/cleat assembly could be improved with an appropriate cover.

It should be appreciated from the foregoing description that there is a need for an aerodynamic cover for a bicycle shoe and clipless pedal/cleat assembly that is optimized for bicycle racing. Specifically, there is a need for an aerodynamic cover that minimizes wind drag while not interfering with the ease with the cleat assembly can be engaged to and disengaged from the bicycle pedal. The present invention satisfies these needs and provides further related advantages.

SUMMARY OF THE INVENTION

The present invention is embodied in a new aerodynamic cover for a bicycle shoe and clipless bicycle pedal for improving speed when cycling. The aerodynamic cover comprises a main body including an ankle portion having a rear side, a heel portion connected to the ankle portion, and a sole portion connected to the heel portion and having an underside. An opening is formed in the sole portion for allowing a bicycle pedal to be engaged to the bicycle cleat. An outwardly extending fin stretches from the rear side of the ankle portion, around the heel portion, to the underside of the sole portion.

More particularly, the sole portion generally defines a plane. The fin is generally symmetrical about an axis that extends through the heel portion at an angle of approximately 30 degrees to approximately 40 degrees, are preferably at an angle of approximately 35 degrees, with respect to the plane of the sole portion. Dimples are formed on an outside surface of the main body for reducing drag.

In other, more detailed features of the invention, the main body further includes a cleat cover portion aligned with the opening formed in the sole portion and configured to receive a bicycle cleat. The rear portion of the cleat cover portion can be connected to a front portion of the fin or be spaced from the fin.

More particularly, the cleat cover portion has a substantially planar bottom surface, a substantially planar top surface spaced in a substantially parallel relationship with the bottom surface of the cleat cover portion, and an opening extending from the bottom surface of the cleat cover portion to the top surface of the cleat cover portion and configured to receive the cleat. The cleat cover portion can be attached to the sole portion or can be a separate piece from the remainder of the aerodynamic cover. The bottom surface of the cleat cover portion covers a smaller area than the top surface of the cleat cover portion.

In one embodiment, the bicycle cleat is configured to releasably engage a clipless bicycle pedal. The cleat comprises a spring housing, a bottom plate configured to be secured to the spring housing, and a spring clip mounted between the spring housing and the bottom plate. The spring housing and bottom plate define an opening sized and shaped to receive a top portion of the clipless bicycle pedal.

In other, more detailed features of the invention, the aerodynamic cover further comprises a pedal cover having a rounded bottom surface, a substantially planar top surface, and a recess defined in the top surface of the pedal cover and configured to receive a bottom portion of a bicycle pedal. A gap is defined between the pedal cover and the cleat cover portion when the bottom portion of the bicycle pedal has been received in the recess defined in the top surface of the pedal cover, a cleat has been received in the opening extending from the bottom surface of the cleat cover portion to the top surface of the cleat cover portion, and the cleat has engaged the bicycle pedal. The gap inhibits excessive friction between the pedal cover and the cleat cover portion as the cleat is pivoted with respect to the pedal. In one embodiment, there is less than or equal to approximately 2 Newton meters of rotational torque resistance between the pedal cover and the cleat cover portion as the cleat is pivoted with respect to the pedal.

In one embodiment, the recess defined in the top surface of the pedal cover extends to a side of the pedal cover, creating an indentation configured to receive a bottom portion of a bicycle pedal spindle. A plurality of tabs extend into the recess and are configured to engage the clipless bicycle pedal. A plurality of projections extend longitudinally in the recess for assisting in properly aligning the pedal cover with the clipless bicycle pedal. Dimples are formed on an outside surface of the pedal cover for reducing drag.

In one embodiment, the aerodynamic cover further comprises a base plate cover. The base plate cover has a substantially planar bottom surface, a top surface that substantially conforms to the bottom surface of the shoe, and an opening extending from the bottom surface of the base plate cover to the top surface of the base plate cover and configured to receive a base plate. The bottom surface of the base plate cover covers a smaller area than the top surface of the base plate cover. The base plate is configured to be attached to a cleat and follow the contour of a bottom surface of a shoe sole.

Other features and advantages of the present invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS

Figure 1:
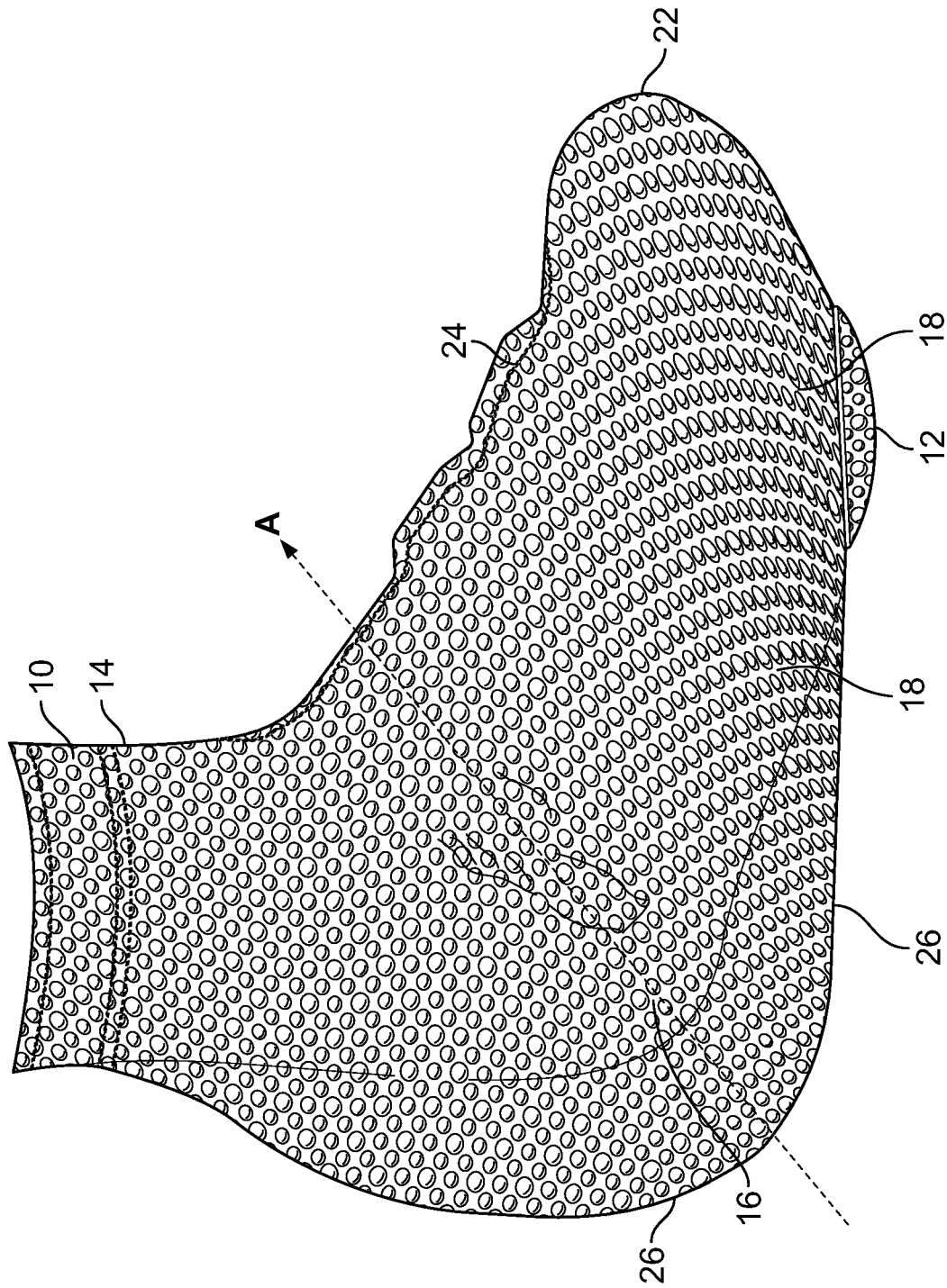
FIG. 1 is a right-side elevation view of a right-foot aerodynamic bicycle shoe cover and pedal cover in accordance with an embodiment of the present invention.
Figure 2:
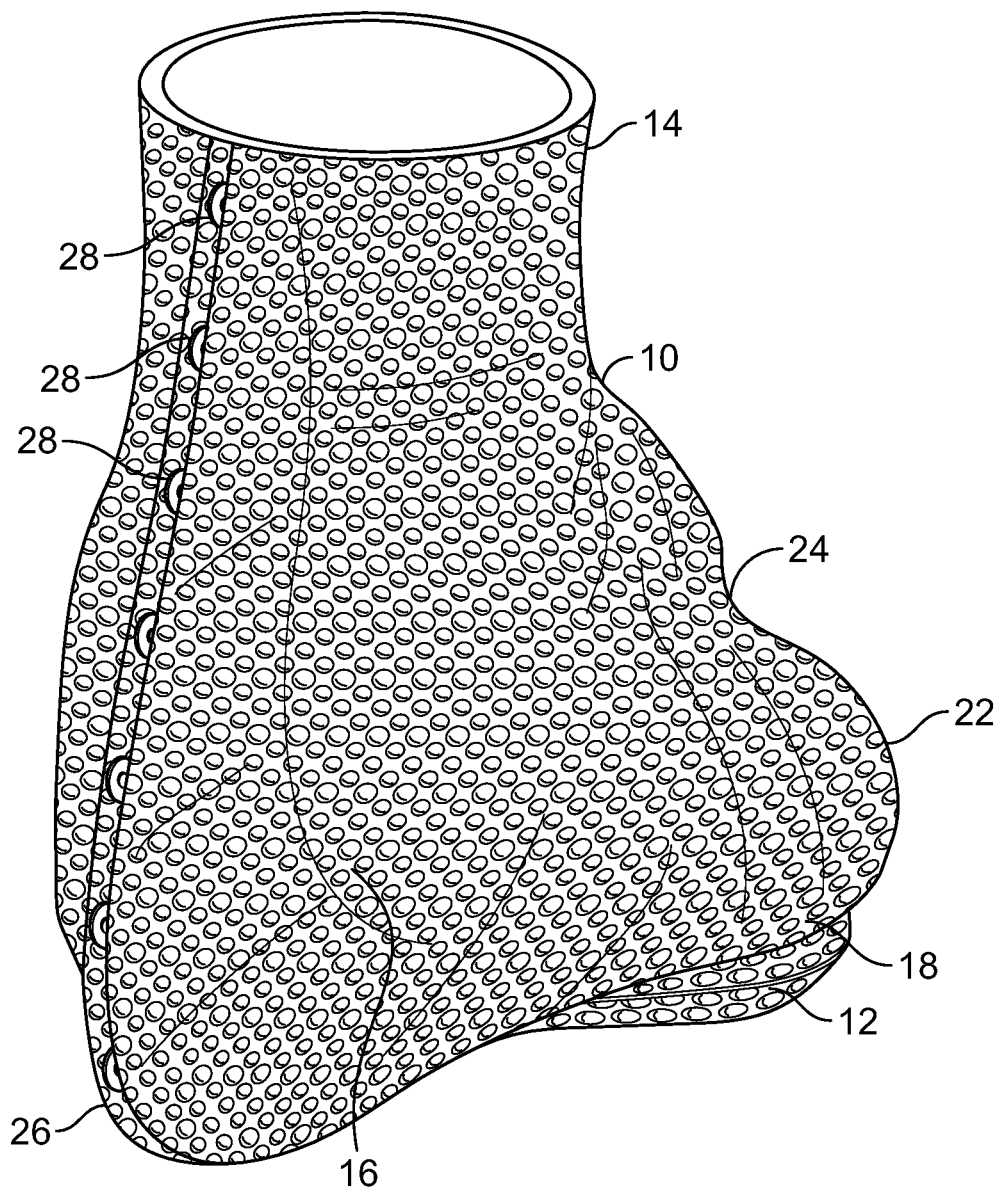
FIG. 2 is a perspective view of the shoe cover and pedal cover of FIG. 1.

With reference to FIGS. 1 and 2, there is shown a right-foot aerodynamic bicycle shoe cover 10 and pedal cover 12 in accordance with an embodiment of the present invention. The particular covers shown are configured for a right bicycle shoe and pedal, but it will be appreciated that similar covers could be oppositely configured for a left bicycle shoe and pedal.

The shoe cover 10 comprises an ankle portion 14, a heel portion 16, a sole portion 18, a cleat cover portion 20 (see FIGS. 3 and 4), a toe portion 22, a top portion 24, a fin 26, and a mechanical closure 28. The fin extends down from the rear side of the ankle portion, around the heel portion, to the underside of the sole portion. The fin is thickest at its innermost portions, where it connects with the ankle portion, heel portion, and sole portion, and thinnest at its outermost portions. In one embodiment, the fin is generally symmetrical about an axis A that extends through the heel portion at an angle of approximately 30 degrees to approximately 40 degrees, and preferably at an angle of approximately 35 degrees, with respect to the general plane of the sole portion. The fin can be formed of a lightweight material, such as closed-cell foam, covered by an aerodynamic material, such as plasticized or rubberized lycra. The fin improves the aerodynamics of the shoe cover, lessening air turbulence behind the shoe cover at it moves through the air. By giving the shoe cover a more streamlined shape, the fin reduces drag caused by a low pressure region created at the rear of the shoe cover.

The mechanical closure 28 secures the shoe cover 10 in place over the shoe. The mechanical closure may comprise a zipper, hook-and-loop fastener, snaps, or other closure device. In one embodiment, the mechanical closure is part of the fin 26. In this embodiment, the fin is divided into a left part and a right part that can be snapped, zipped, or otherwise fastened together.

Figure 3:
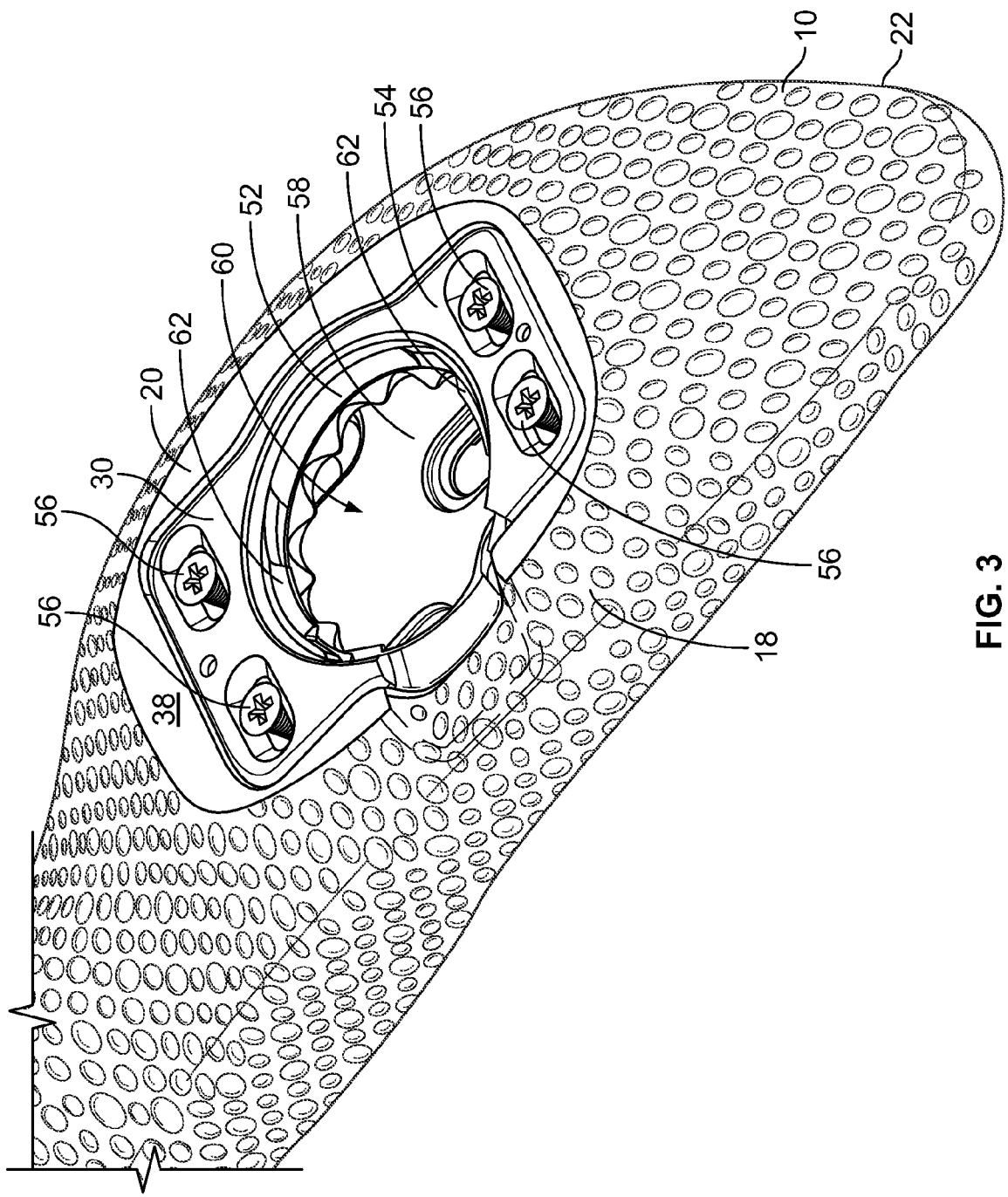
FIG. 3 is a perspective view of a bicycle cleat and the sole portion, cleat cover portion, and toe portion of the shoe cover of FIG. 1, with the cleat detached from a bicycle pedal.

With reference now to FIG. 3, there is shown a bicycle cleat 30 and the sole portion 18, cleat cover portion 20, and toe portion 22 of the shoe cover 10 in accordance with an embodiment of the present invention, with the cleat detached from a bicycle pedal. As shown in FIG. 3, an opening is formed in the cleat cover portion to accommodate the cleat and allow the cleat to be engaged to a bicycle pedal.

In one embodiment, the cleat cover portion 20 is integral to the remainder of the shoe cover 10. The cleat cover portion can be formed of a lightweight material, such as closed-cell foam, and bonded to the aerodynamic material that comprises the sole portion 18. The rear end of the cleat cover portion can be connected to or spaced from the fin 26 (shown in FIGS. 1 and 2). In another embodiment, the cleat cover portion is a separate piece from the remainder of the shoe cover, in which case the sole portion can be configured to fit snugly over the rounded edge of the cleat cover.

Figure 4:
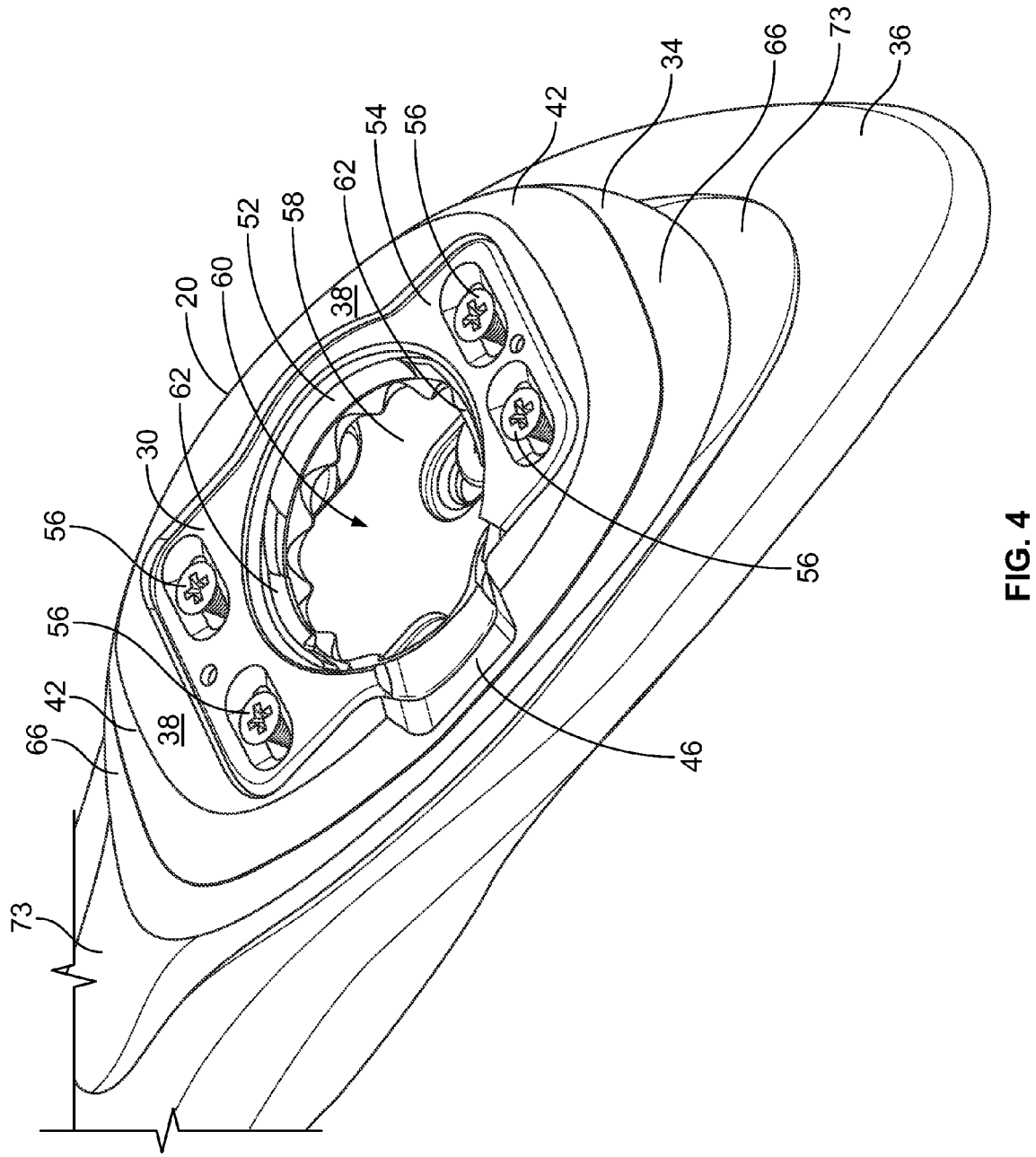
FIG. 4 is a perspective view of the cleat of FIG. 3, the cleat cover portion of the shoe cover of FIG. 1, and a base plate cover positioned on the underside of a shoe sole, with the remaining portions of the shoe cover removed to show the shoe sole and the details of the cleat, cleat cover portion, and base plate cover.
Figure 8:
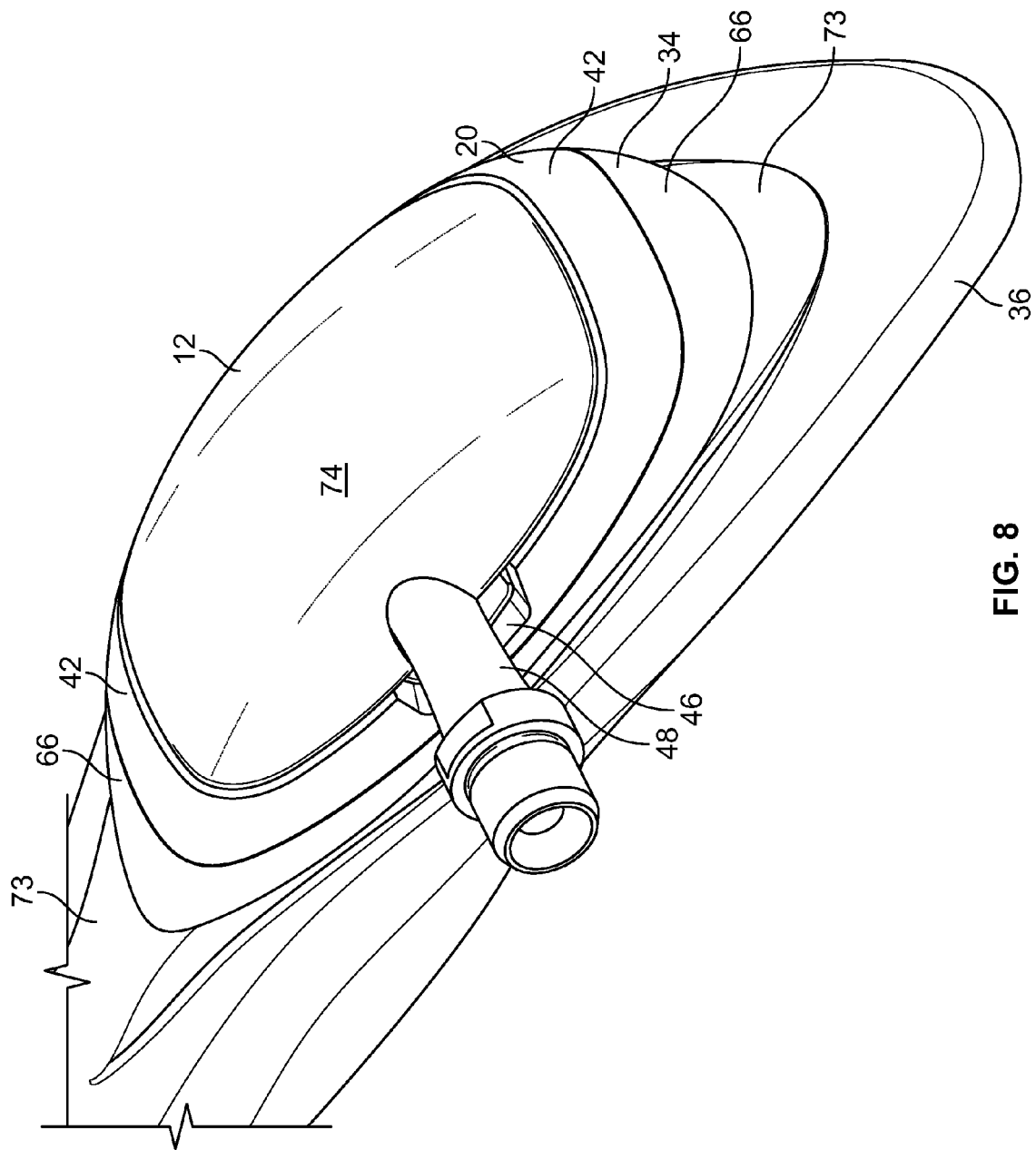
FIG. 8 is a perspective view of the pedal cover of FIG. 1, the cleat cover portion of the shoe cover of FIG. 1, and the base plate cover of FIG. 5 positioned on the underside of a shoe sole, with the remaining portions of the shoe cover removed to show the shoe sole and the details of the cleat cover portion and base plate cover.
Figure 9:
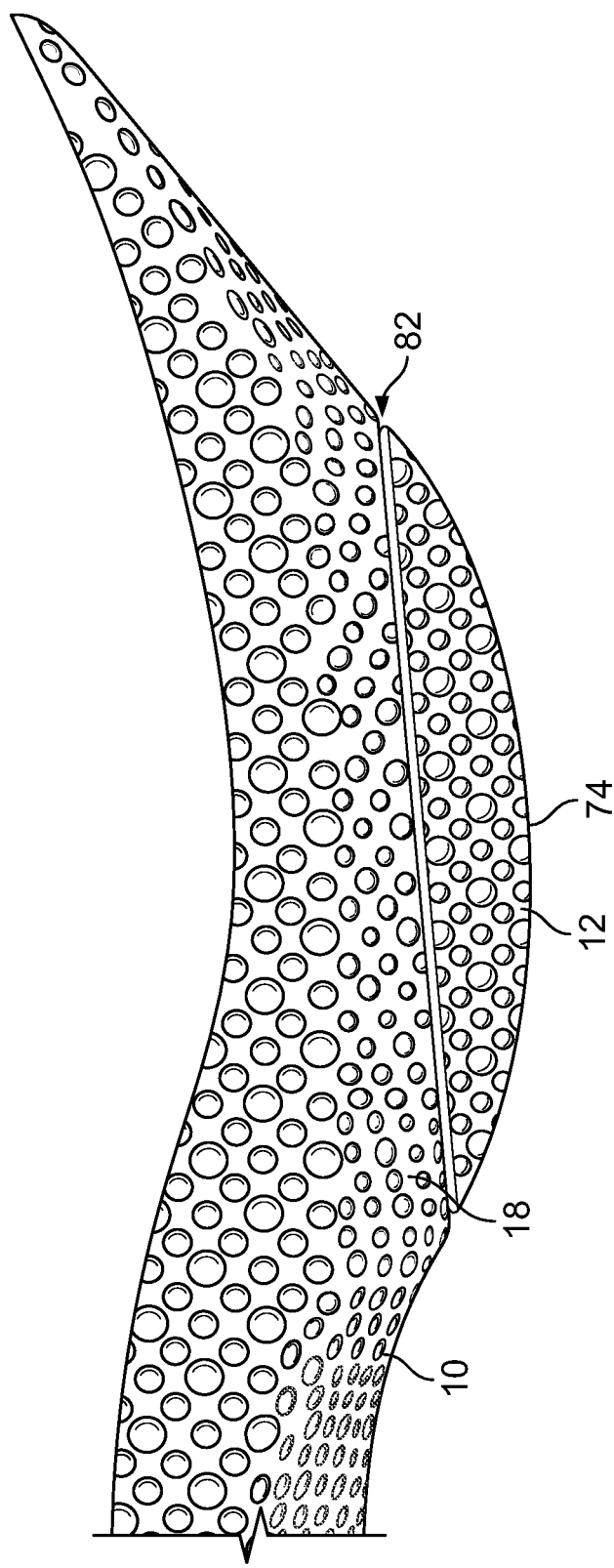
FIG. 9 is a right-side elevation view of the pedal cover and portions of the shoe cover of FIG. 1.
Figure 10:
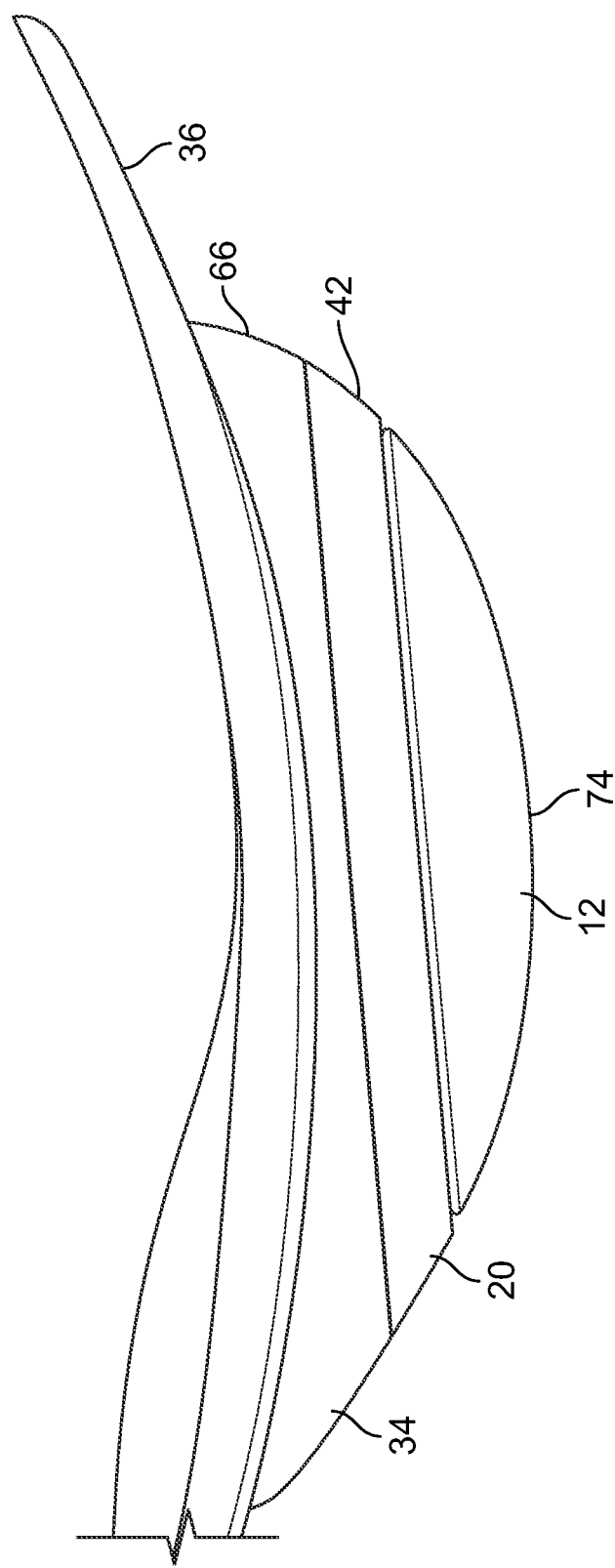
FIG. 10 is a right-side elevation view of the pedal cover of FIG. 1, the cleat cover portion of the shoe cover of FIG. 1, and the base plate cover of FIG. 5 positioned on the underside of a shoe sole, with the remaining portions of the shoe cover removed to show the shoe sole and the details of the cleat cover portion and base plate cover.
Figure 11:
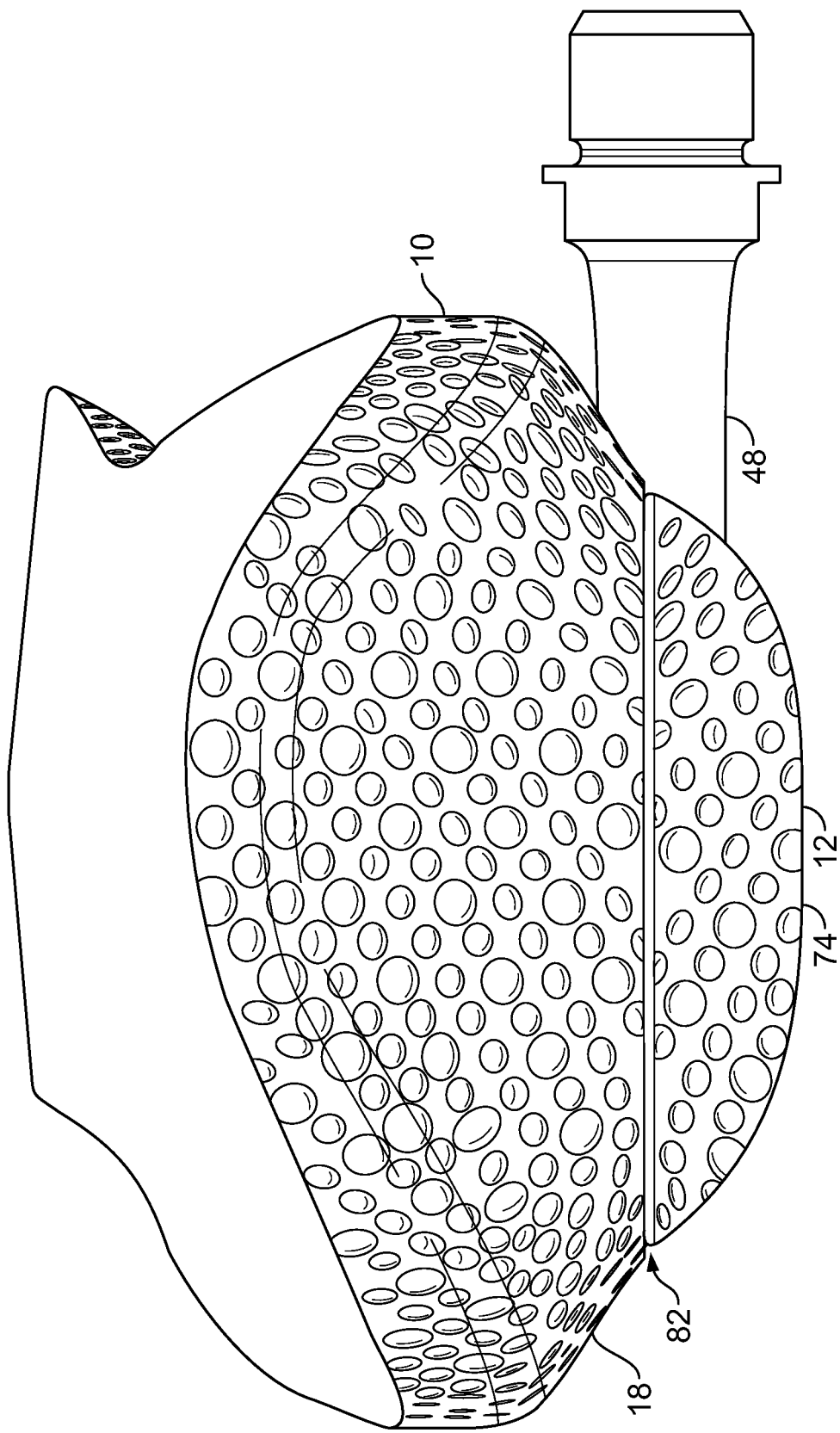
FIG. 11 is a front elevation view of the pedal cover and portions of the shoe cover of FIG. 1, with a pedal spindle protruding from the pedal cover.
Figure 12:
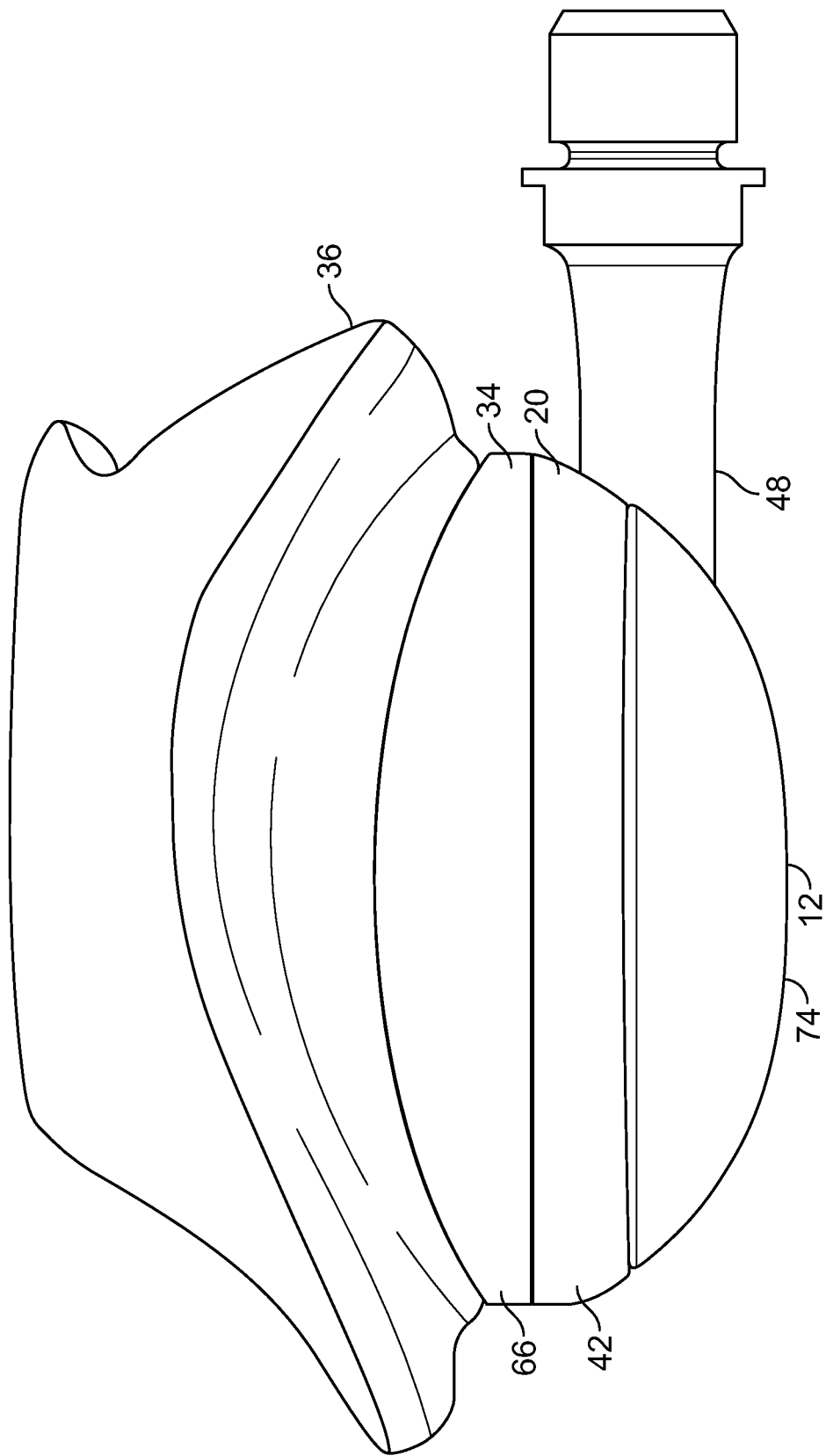
FIG. 12 is a front elevation view of the pedal cover of FIG. 1, the cleat cover portion of the shoe cover of FIG. 1, and the base plate cover of FIG. 5 positioned on the underside of a shoe sole, with the remaining portions of the shoe cover removed to show the shoe sole and the details of the cleat cover portion and base plate cover.
Figure 13:
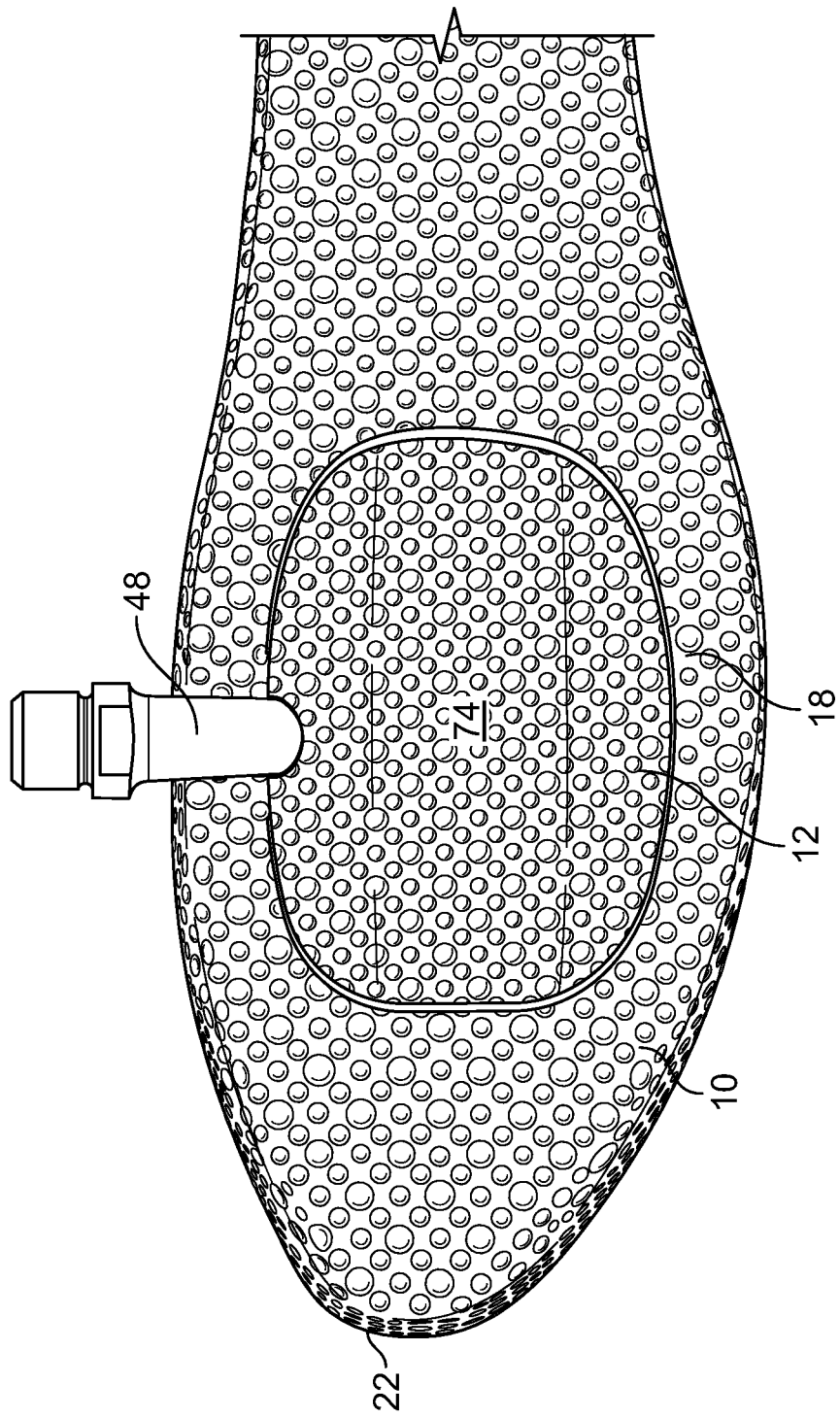
FIG. 13 is a bottom plan view of the pedal cover and portions of the shoe cover of FIG. 1, with a pedal spindle protruding from the pedal cover.
Figure 14:
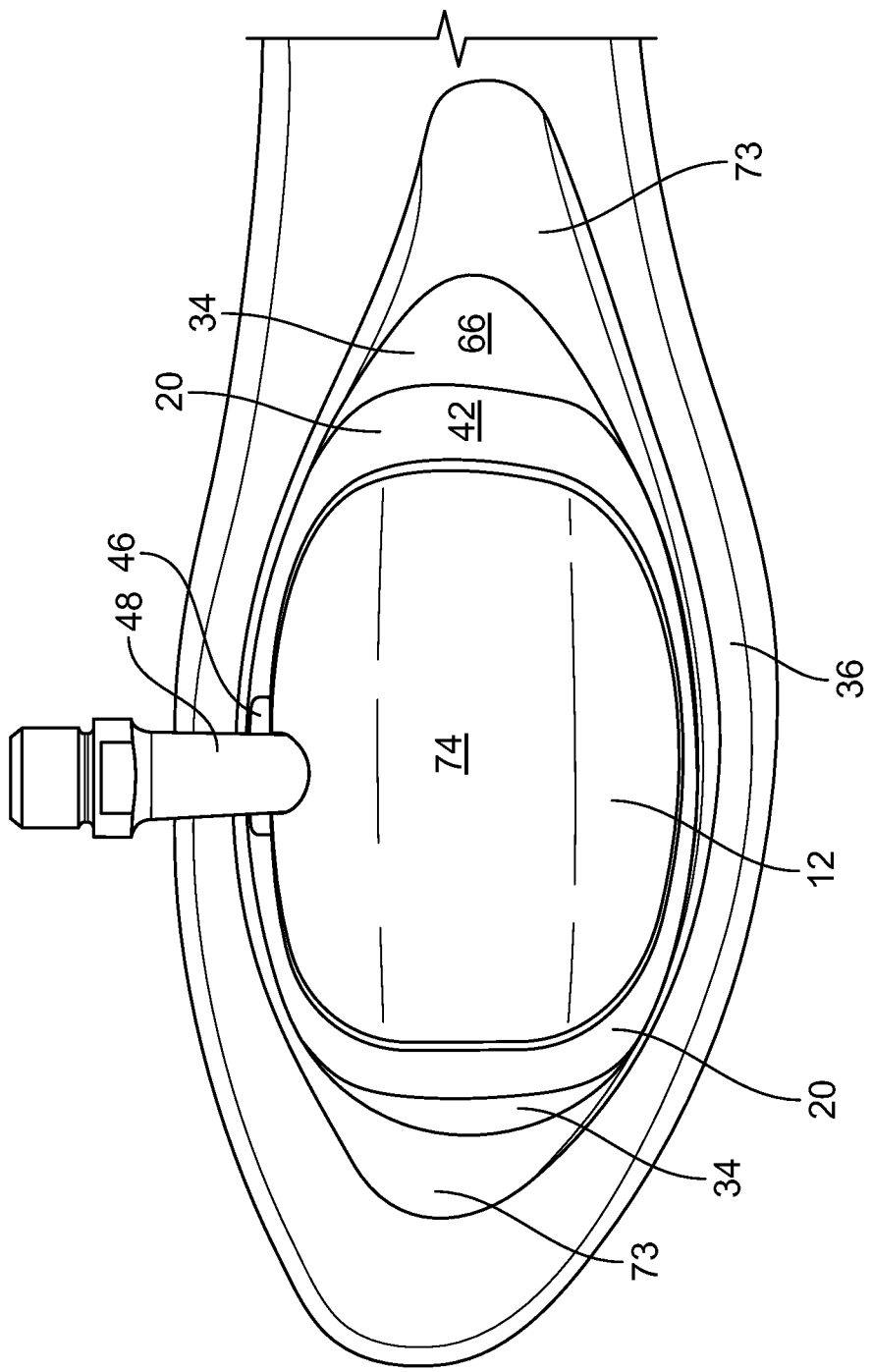
FIG. 14 is a bottom plan view of the pedal cover of FIG. 1, the cleat cover portion of the shoe cover of FIG. 1, and the base plate cover of FIG. 5 positioned on the underside of a shoe sole, with the remaining portions of the shoe cover removed to show the shoe sole and the details of the cleat cover portion and base plate cover.

With reference now to FIG. 4, there is shown the cleat 30, the cleat cover portion 20 of the shoe cover 10, and a base plate cover 34 positioned on the underside of a shoe sole 36 in accordance with an embodiment of the present invention, with the remaining portions of the shoe cover removed to show the shoe sole and the details of the cleat, cleat cover portion, and base plate cover. As shown, the cleat cover portion is configured to surround the cleat. It has a substantially planar bottom surface 38, a substantially planar top surface spaced in a parallel relationship with the bottom surface, and a rounded edge 42. The bottom surface of the cleat cover portion covers a smaller area than the top surface. The top surface of the cleat cover portion is sized and shaped to conform substantially to the size and shape of the bottom surface 44 of the base plate cover (see FIG. 5). The opening formed in the cleat cover portion extends from the bottom surface of the cleat cover portion to the top surface and is configured to receive the cleat. An indentation 46 is defined in the rounded edge 42, proximate to the center of the left side of the cleat cover portion and is configured to accommodate the top of the spindle 48 of a bicycle pedal 50 (see FIG. 8).

In one embodiment, as shown in FIG. 3, the aerodynamic material that comprises the sole portion 18 of the shoe cover 10 covers the entirety of the rounded edge 42 of the cleat cover portion 20 and is bonded thereto. The aerodynamic material thus is shaped by the rounded edge.

A variety of cleats compatible with a clipless pedal system may be used with the present invention. The particular cleat 30 shown in FIGS. 3 and 4 includes a plastic spring housing 52 and a steel bottom plate 54 configured to be secured, together, by four screws 56 to a plastic base plate 58. The spring housing and bottom plate, together, define a circular central opening 60 sized and shaped to conformably receive the pedal 50. A single horseshoe-shaped spring clip 62 is mounted between the spring housing and the bottom plate, for releasably engaging the pedal when the cleat is positioned over the pedal. Further details about this particular cleat are disclosed in U.S. Patent Application Publication No. 2008/0110294 to Richard M. Bryne, which is incorporated herein by reference. Although the particular cleat shown has a central opening sized and shaped to receive a pedal, the present invention is compatible with a clipless pedal system wherein the cleat has a projection sized and shaped to be conformably received within a corresponding opening in a pedal.

Figure 5:
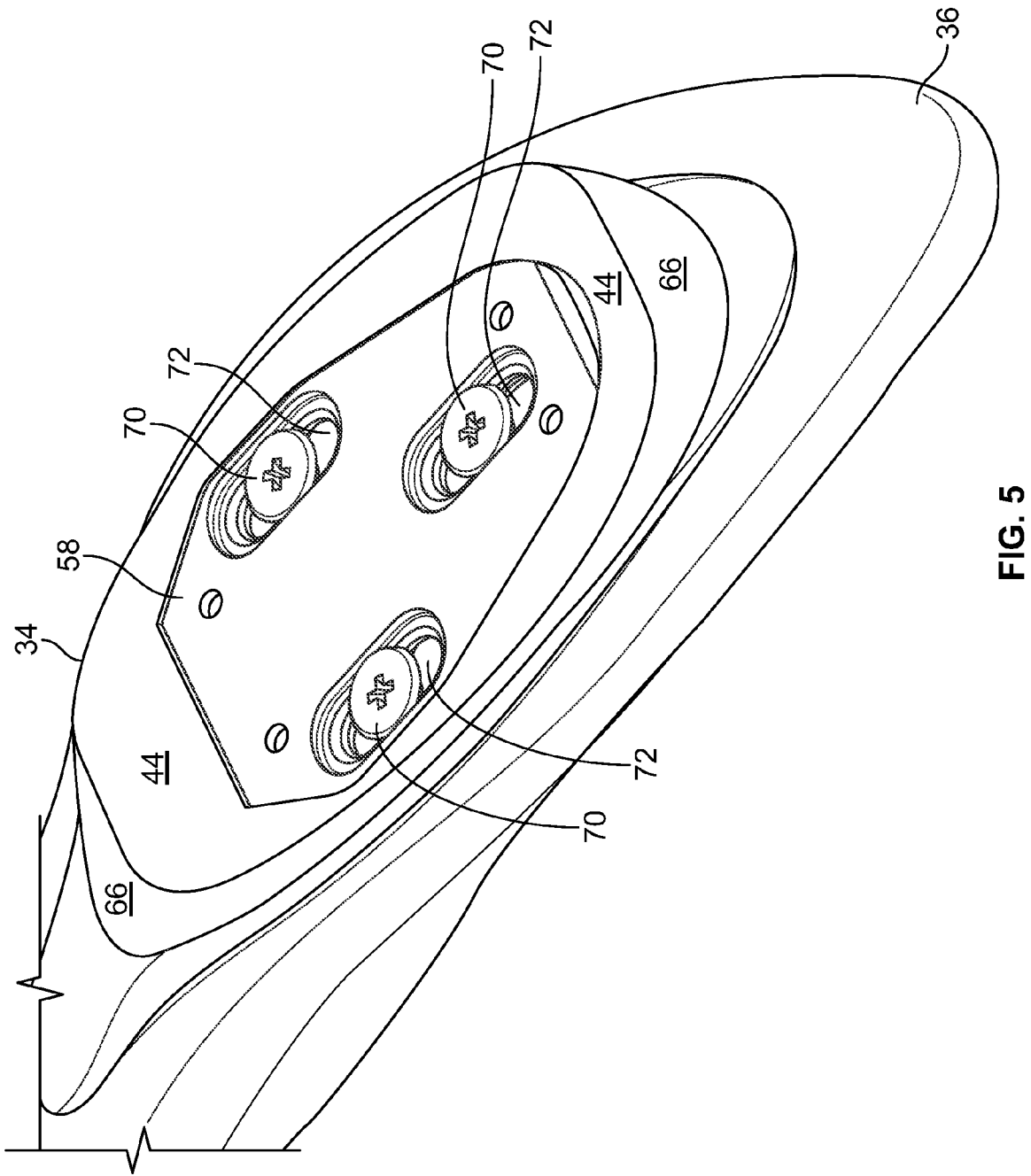
FIG. 5 is a perspective view of the base plate cover of FIG. 5 and a base plate positioned on the underside of a shoe sole.

With reference now to FIG. 5, there is shown the base plate cover 34 and base plate 58 positioned on the underside of the shoe sole 36 in accordance with an embodiment of the present invention. The base plate cover is configured to surround the base plate, to which the cleat 30 is configured to be attached. The base plate cover has a substantially planar bottom surface 44, a top surface that substantially conforms to the shape of the underside of the shoe sole, and a rounded edge 66. The bottom surface of the base plate cover covers a smaller area than the top surface. An opening is defined in the base plate cover, extending from the bottom surface to the top surface and configured to receive the base plate.

The base plate 58 itself is configured to be secured to the shoe sole 36 by screws 70 extending through three elongated openings 72 in the base plate. The base plate may be secured to a raised portion 73 of the shoe sole. Further details about this particular base plate are disclosed in U.S. Patent Application Publication No. 2008/0110294 to Richard M. Bryne. The present invention is also compatible with a clipless pedal system wherein the cleat is positioned on the underside of the shoe sole without a base plate.

Figure 6A:
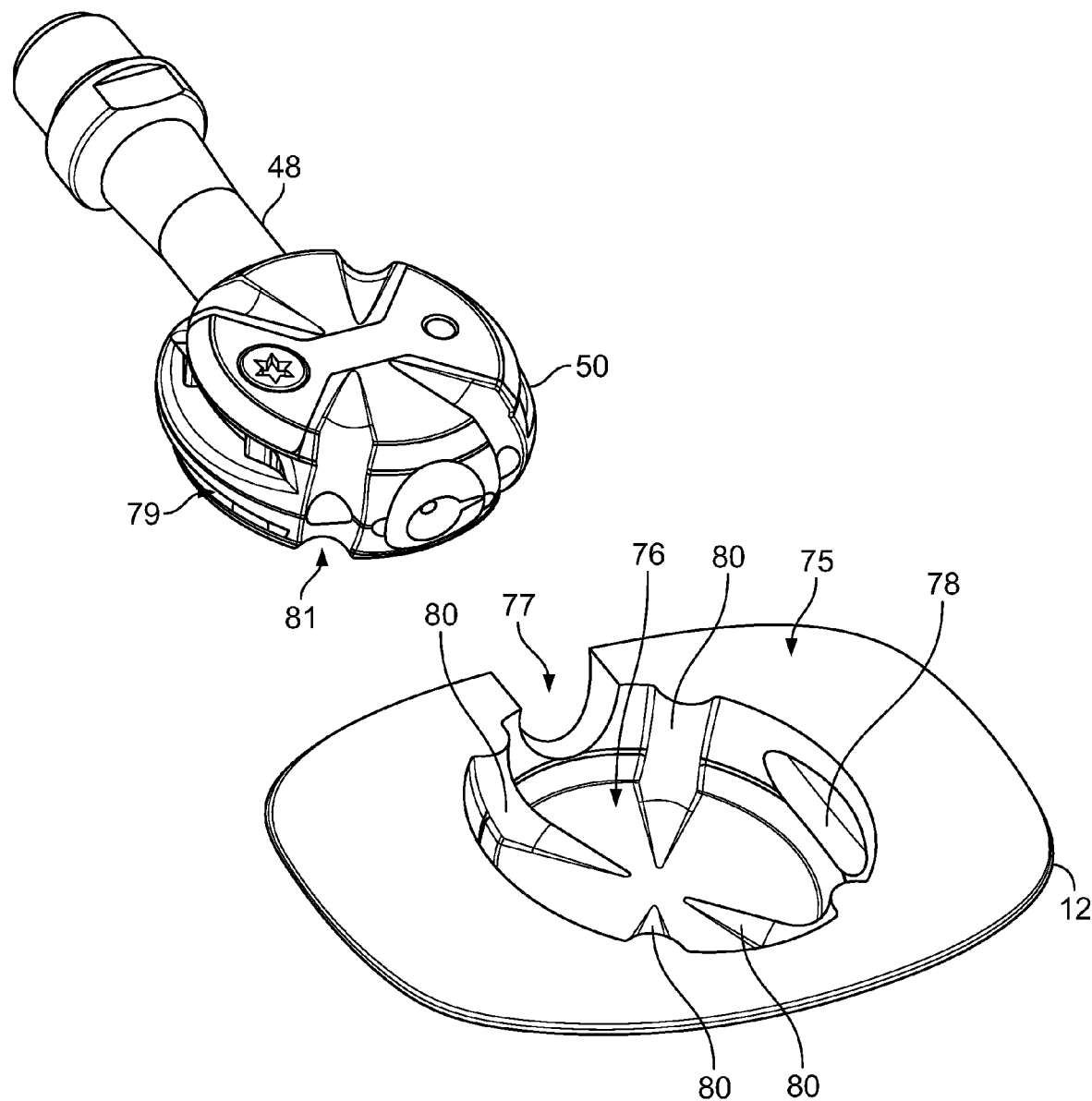
FIG. 6A is a perspective view of the pedal cover of FIG. 1 and a bicycle pedal, with the pedal cover detached from the pedal.
Figure 6B:
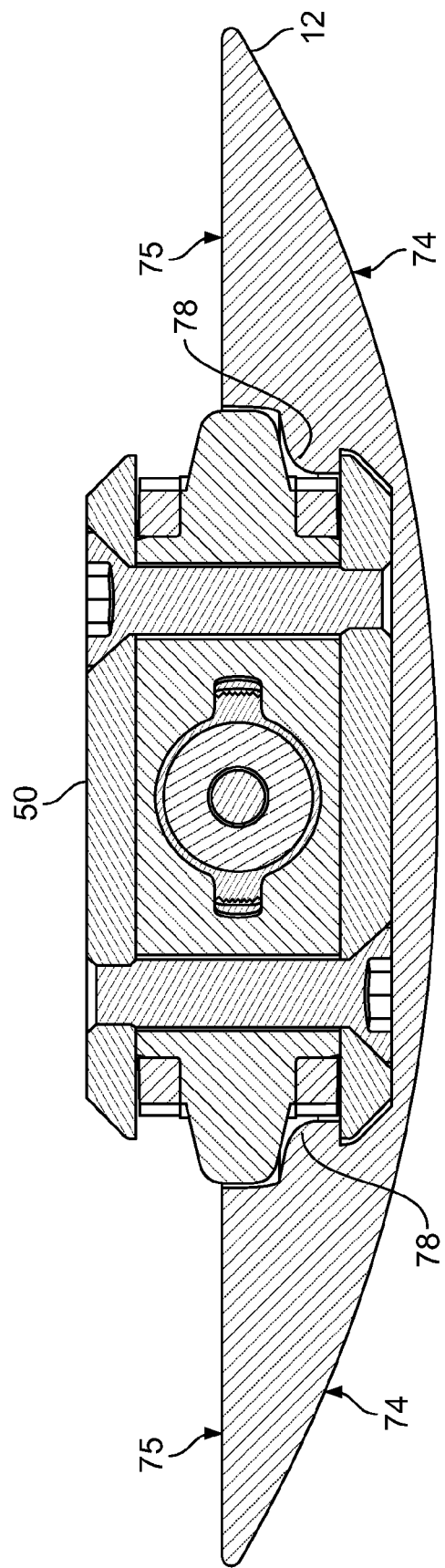
FIG. 6B is a cross-sectional view of the pedal cover of FIG. 1 and the pedal of FIG. 6A, with the pedal cover attached to the pedal.
Figure 7:
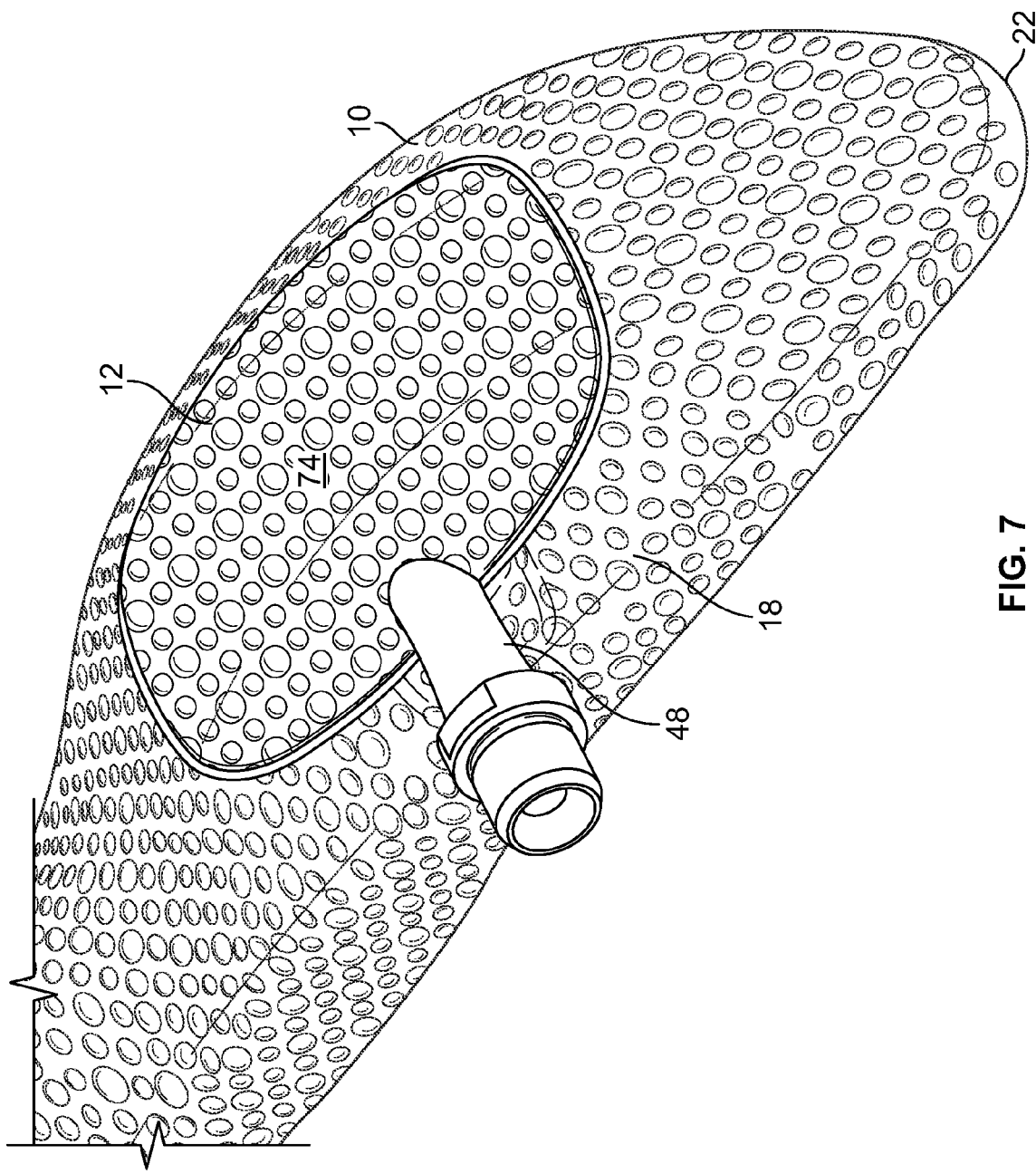
FIG. 7 is a perspective view of the pedal cover and portions of the shoe cover of FIG. 1, with a pedal spindle protruding from the pedal cover.

With reference now to FIGS. 6A and 6B, there is shown the pedal cover 12 and the pedal 50 in accordance with an embodiment of the present invention. The pedal cover is configured to be removably attached to the bottom of the pedal 50. It has a rounded bottom surface 74 and a substantially planar top surface 75 having a recess 76 therein. The top surface of the pedal cover is sized and shaped to conform substantially to the size and shape of the bottom surface 38 of the cleat cover portion 20 of the shoe cover 10. The recess is configured to receive the pedal and extends to the left side of the pedal cover, creating an indentation 77 in the left side that is configured to receive the bottom of the spindle 48 of the pedal. The pedal cover is attached to the pedal by means of a pair of identical, opposing side tabs 78 configured to engage a pair of identical, opposing indentations 79 in the pedal. Four longitudinally extending projections 80 engage four longitudinally extending grooves 81 in the pedal to keep the pedal cover correctly positioned with respect to the pedal.

With reference now to FIGS. 7-14, there are shown various views of the pedal cover 12 and portions of the shoe cover 10 in accordance with an embodiment of the present invention, with the pedal cover in place beneath the shoe cover. In FIGS. 8, 10, 12 and 14, portions of the shoe cover are removed to show the shoe sole 36 and the details of the base plate cover 34 and cleat cover portion 20 of the shoe cover. The combination of the pedal cover 12, cleat cover portion 20, and base plate cover 34 has a general teardrop shape to minimize drag.

A small gap 82 is defined between the pedal cover 12 and the cleat cover portion 20 of the shoe cover 10 when the pedal 50 has been received in the pedal cover, the cleat 30 has been received in the cleat cover portion, and the cleat has engaged the pedal. The gap assists a bicyclist in pivoting the cleat with respect to the pedal so that the cleat can be engaged to and disengaged from the pedal. The gap reduces rubbing between the pedal cover and cleat cover portion as the bicyclist pivots the cleat, thus minimizing the possibility that the shoe cover and pedal cover might interfere with the process of engaging the cleat to and disengaging the cleat from the pedal. In one embodiment, there is less than or equal to approximately 2 Newton meters of rotational torque resistance between the pedal cover and the cleat cover portion as the cleat is pivoted with respect to the pedal.

Figure 15:
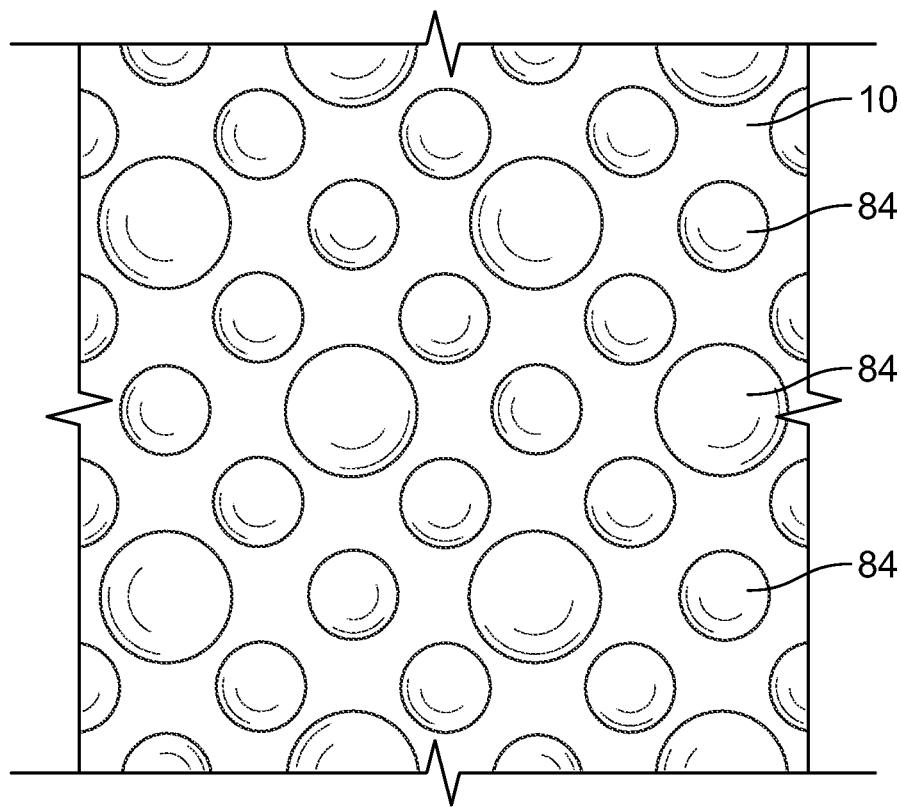
FIG. 15 is a detail view of a portion of the shoe cover of FIG. 1, showing dimples formed in the shoe cover.

With reference now to FIG. 15, there is shown a detail view of a portion of the shoe cover 10, showing dimples 84 formed in the cover. The dimples reduce drag, similar to the way dimples on a golf ball reduce drag.

Although the invention has been described in detail with reference only to the presently preferred embodiments, those skilled in the art will appreciate that various modifications can be made without departing from the invention. Accordingly, the invention is defined only by the following claims.

What is claimed is:

1. An aerodynamic cover for a bicycle pedal and cleat, the cleat attached to a base plate and the base plate attached to a bottom surface of a shoe sole, the aerodynamic cover comprising:
    a pedal layer having
        a rounded bottom surface,
        a substantially planar top surface, and
        a recess defined in the top surface of the pedal layer and configured to receive a portion of the bicycle pedal;
    a cleat layer having
        a substantially planar bottom surface,
        a substantially planar top surface spaced in a substantially parallel relationship with the bottom surface of the cleat layer, and
        an opening extending from the bottom surface of the cleat layer to the top surface of the cleat layer and configured to receive the cleat; and
    a base plate layer having
        a substantially planar bottom surface,
        a top surface that substantially conforms to the bottom surface of the shoe sole, and
        an opening extending from the bottom surface of the base plate layer to the top surface of the base plate layer and configured to receive the base plate;
    wherein the top surface of the cleat layer is sized and shaped to conform substantially to a size and shape of the bottom surface of the base plate layer.

2. The aerodynamic cover of claim 1, wherein the bottom surface of the cleat layer covers a smaller area than the top surface of the cleat layer.

3. The aerodynamic cover of claim 1, wherein the bottom surface of the base plate layer covers a smaller area than the top surface of the base plate layer.

4. The aerodynamic cover of claim 1, wherein:
    a gap is defined between the pedal layer and the cleat layer when the portion of the bicycle pedal has been received in the recess defined in the top surface of the pedal layer, the cleat has been received in the opening extending from the bottom surface of the cleat layer to the top surface of the cleat layer, and the cleat has engaged the bicycle pedal; and the gap inhibits excessive friction between the pedal layer and the cleat layer as the cleat is pivoted with respect to the pedal, so that there is less than or equal to approximately 2 Newton meters of rotational torque resistance between the pedal layer and the cleat layer as the cleat is pivoted with respect to the pedal.

5. A bicycle pedal/cleat assembly comprising:
a clipless bicycle pedal;
a pedal cover configured to be removably attached to the clipless bicycle pedal and having
   a rounded bottom surface,
   a substantially planar top surface, and
   a recess defined in the top surface of the pedal cover and configured to receive a bottom portion of the clipless bicycle pedal;
a bicycle cleat configured to releasably engage the clipless bicycle pedal and comprising
   a spring housing,
   a bottom plate configured to be secured to the spring housing, and
   a spring clip mounted between the spring housing and the bottom plate,
   wherein the spring housing and bottom plate define an opening sized and shaped to receive a top portion of the clipless bicycle pedal;
a cleat cover configured to surround the cleat and having
   a substantially planar bottom surface,
   a substantially planar top surface spaced in a substantially parallel relationship with the bottom surface of the cleat cover, and
   an opening extending from the bottom surface of the cleat cover to the top surface of the cleat cover and configured to receive the cleat;
a base plate configured to be attached to the cleat and to a bottom surface of a shoe sole; and
a base plate cover configured to surround the base plate and having
   a substantially planar bottom surface,
   a top surface that substantially conforms to the bottom surface of the shoe sole, and
   an opening extending from the bottom surface of the base plate cover to the top surface of the base plate cover and configured to receive the base plate.

6. The bicycle pedal/cleat assembly of claim 5, wherein the bottom surface of the cleat cover covers a smaller area than the top surface of the cleat cover.

7. The bicycle pedal/cleat assembly of claim 5, wherein the bottom surface of the base plate cover covers a smaller area than the top surface of the base plate cover.

8. The bicycle pedal/cleat assembly of claim 5, wherein:
   a gap is defined between the pedal cover and the cleat cover when the bottom portion of the clipless bicycle pedal has been received in the recess defined in the top surface of the pedal cover, the cleat has been received in the opening extending from the bottom surface of the cleat cover to the top surface of the cleat cover, and the cleat has engaged the clipless bicycle pedal; and
   the gap inhibits excessive friction between the pedal cover and the cleat cover as the cleat is pivoted with respect to the clipless bicycle pedal, so that there is less than or equal to approximately 2 Newton meters of rotational torque resistance between the pedal cover and the cleat cover as the cleat is pivoted with respect to the clipless bicycle pedal.

* * * * *